(12) United States Patent
Raichelgauz et al.

(10) Patent No.: US 10,839,694 B2
(45) Date of Patent: Nov. 17, 2020

(54) BLIND SPOT ALERT

(71) Applicant: CARTICA AI LTD, Tel Aviv (IL)

(72) Inventors: Igal Raichelgauz, Tel Aviv (IL); Karina Odinaev, Tel Aviv (IL)

(73) Assignee: CARTICA AI LTD, Tel Aviv (IL)

( * ) Notice: Subject to any disclaimer, the term of this patent is extended or adjusted under 35 U.S.C. 154(b) by 0 days.

(21) Appl. No.: 16/706,751

(22) Filed: Dec. 8, 2019

(65) Prior Publication Data

US 2020/0126424 A1    Apr. 23, 2020

Related U.S. Application Data

(63) Continuation of application No. PCT/IB2019/058208, filed on Sep. 27, 2019.

(60) Provisional application No. 62/747,147, filed on Oct. 18, 2018, provisional application No. 62/827,112, filed on Mar. 31, 2019.

(51) Int. Cl.
   *G08G 1/16* (2006.01)
   *G08G 1/04* (2006.01)

(52) U.S. Cl.
   CPC .............. *G08G 1/167* (2013.01); *G08G 1/04* (2013.01)

(58) Field of Classification Search
   CPC .................................. G08G 1/167; G08G 1/04
   See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Big Bang Theory Series 04 Episode 12, aired Jan. 6, 2011; [retrieved from Internet: ].

(Continued)

*Primary Examiner* — Sisay Yacob (74) *Attorney, Agent, or Firm* — Reches Patent (57) ABSTRACT

A method for estimating a potential blind spot event related to a potential blind spot of a first vehicle, the method may include detecting, using at least one sensor of a second vehicle, the first vehicle and a spatial relationship between the first vehicle and the second vehicle; estimating, based on at least one blind spot parameter of the first vehicle, an occurrence of the potential blind spot event; wherein the potential blind spot event occurs when the second vehicle is within a potential blind spot of the first vehicle or is about to enter the potential blind spot of the first vehicle; and responding to the estimated occurrence of the potential blind spot event.

27 Claims, 5 Drawing Sheets

(56) References Cited

U.S. PATENT DOCUMENTS

| | | |
|---|---|---|
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1* | 9/2002 | Patchell .......... G08G 1/162 340/436 |
| 2002/0126872 A1 | 9/2002 | Brunk et al. |
| 2002/0129140 A1 | 9/2002 | Peled et al. |

(56) References Cited

U.S. PATENT DOCUMENTS

| | | |
|---|---|---|
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1* | 2/2009 | Taguchi ............ B60W 30/095 |
| | | 701/117 |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1* | 4/2009 | Emam ................... G08G 1/167 |
| | | 340/901 |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |

(56) References Cited

U.S. PATENT DOCUMENTS

| | | |
|---|---|---|
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1* | 2/2013 | Al-Jafar ............... B60Q 9/008 340/439 |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1* | 4/2018 | Dilger ..................... B62J 6/00 |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

International Search Report and Written Opinion for PCT/US2016/050471, ISA/RU, Moscow, RU, dated May 4, 2017.

Wang et al., "Classifying Objectionable Websites Based onImage Content", Stanford University, pp. 1-12.

"Computer Vision Demonstration Website", Electronics and Computer Science, University of Southampton, 2005, USA.

Big Bang Theory Series 04 Episode 12, aired Jan. 06, 2011; [retrieved from Internet: ].

(56) References Cited

OTHER PUBLICATIONS

Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 34, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma et el "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-Soc: A Multi-Core Soc Architecture for Multimedia Signal Processing" 2003).
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onlmage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.

(56) References Cited

OTHER PUBLICATIONS

Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Lin et al., "Summarization of Large Scale Social Network Activity", DOI: 10.1109/ICASSP.2009.4960375, Apr. 2009, pp. 3481-3484.
Santos et al., "SCORM-MPEG: an ontology of interoperable metadata for Multimedia and e-Learning", DOI: 10.1109/SOFTCOM.2015.7314122, Nov. 2, 2015, pp. 5.
Scheper et al., "Nonlinear dynamics in neural computation", ESANN, 14th European Symposium on Artificial Neural Networks, Jan. 2006, pp. 491-502.
Schneider et al., "A Robust Content Based Digital Signature for Image Authentication", 3rd IEEE International Conference on Image Processing, Sep. 19, 2006, pp. 227-230.
Semizarov et al.,"Specificity of short interfering RNA determined through gene expression signatures", PNAS vol. 100 (11), May 27, 2003, pp. 6347-6352.
Sheng Hua et al., "Robust video signature based on ordinal measure", ICIP '04. 2004 International Conference on Image Processing, Oct. 2004, pp. 685-688.
Stolberg et al., "HiBRID-SoC: A multi-core SoC architecture for multimedia signal processing. VLSI Signal Processing", Journal of VLSI Signal Processing vol. 41(1), Aug. 2005, pp. 9-20.
Theodoropoulos et al., "Simulating asynchronous architectures on transputer networks", 4th Euromicro Workshop on Parallel and Distributed Processing, Braga, Portugal, 1996, pp. 274-281.
Vailaya et al., "Content-Based Hierarchical Classification of Vacation Images", International Conference on Multimedia Computing and Systems, vol. 1, DOI-10.1109/MMCS.1999.779255, Jul. 1999, pp. 518-523.
Verstraeten et al., "Isolated word recognition with the Liquid State Machine: A case study", Information Processing Letters, vol. 95(6), Sep. 2005, pp. 521-528.
Vallet et al.,"Personalized Content Retrieval in Context Using Ontological Knowledge", in IEEE Transactions on Circuits and Systems for Video Technology, vol. 17, No. 3, Mar. 2007, pp. 336-346.
Wang et al., "Classifying objectionable websites based on image content" Interactive Distributed Multimedia Systems and Telecommunication Services, vol. 1483, 1998, pp. 113-124.
Wang et al., "A Signature for Content-Based Image Retrieval Using a Geometrical Transform", 6th ACM International Conference on Multimedia, Multimedia 1998, pp. 229-234.
Ware et al., "Locating and identifying components in a robot's workspace using a hybrid computer architecture", 10th International Symposium on Intelligent Control, 1995, pp. 139-144.
Li et al. "Exploring Visual and Motion Saliency for Automatic Video Object Extraction", in IEEE Transactions on Image Processing, vol. 22, No. 7, Jul. 2013, pp. 2600-2610.
Colin Whitby-Strevens, "The transputer", 12th annual international symposium on Computer architecture (ISCA), IEEE Computer Society Press, Jun. 1985, pp. 292-300.
Wilk et al., "The potential of social-aware multimedia prefetching on mobile devices", International Conference and Workshops on Networked Systems (NetSys 2015) Mar. 2015, p. 1.
Andrew William Hogue, "Tree pattern inference and matching for wrapper induction on the World Wide Web", May 13, 2014, pp. 106.
Liu et al. "Instant Mobile Video Search With Layered Audio-Video Indexing and Progressive Transmission", IEEE Transactions on Multimedia 16(Dec. 8, 2014, pp. 2242-2255.
Raichelgauz et al., "Natural Signal Classification by Neural Cliques and Phase-Locked Attractors", International Conference of the IEEE Engineering in Medicine and Biology Society, 2006, pp. 6693-6697.

Lin et al., "Robust digital signature for multimedia authentication", IEEE Circuits and Systems Magazine, vol. 3, No. 4, 2003, pp. 23-26.
Zang et al., "A New Multimedia Message Customizing Framework for mobile Devices", IEEE International Conference on Multimedia and Expo, 2007, pp. 1043-1046.
Zhou et al., "Ensembling neural networks: Many could be better than all", Artificial Intelligence, vol. 137, 2002, pp. 239-263.
Zhou et al., "Medical diagnosis with C4.5 rule preceded by artificial neural network ensemble", IEEE Transactions on Information Technology in Biomedicine, vol. 7, No. 1, Mar. 2003, pp. 37-42.
Zhu et al., "Technology-Assisted Dietary Assessment", SPIE. 6814. 681411, 2008, p. 1.
Zou et al., "A content-based image authentication system with lossless data hiding", International Conference on Multimedia and Expo. ICME, 2003, pp. II(213)-II(216).
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. 2008 Mar. 20, pp. 1-15.
Zou et al., "A Content-Based Image Authentication System with Lossless Data Hiding", ICME 2003, pp. 213-216.
Akira et al., "Columbia University's Baseline Detectors for 374 LSCOM Semantic Visual Concepts", Columbia University Advent Technical Report #222-2006-8, Mar. 20, 2007, pp. 17.
Amparo et al., "Real Time Speaker Localization and Detection System for Camera Steering in Multiparticipant Videoconferencing Environments", IEEE International Conference on Acoustics, Speech and Signal Processing 2011,pp. 2592-2595.
Boari et al., "Adaptive Routing for Dynamic Applications in Massively Parallel Architectures", IEEE Parallel & Distributed Technology: Systems & Applications (vol. 3, Issue: 1, Spring 1995), pp. 61-74.
Boyer et al., "A Crossover Operator for Evolutionary Algorithms Based on Population Features", Journal of Artificial Intelligence Research vol. 24 (2005) pp. 1-48.
Brecheisen et al., ""Hierarchical Genre Classification for Large Music Collections"", IEEE International Conference on Multimedia and Expo (ICME) 2006, pp. 1385-1388.
Burgsteiner et al., "Movement prediction from real-world images using a liquid state machine",International Conference on Industrial, Engineering and Other Applications of Applied Intelligent Systems IEA/AIE 2005: Innovations in Applied Artificial Intelligence, pp. 121-130.
Cernansky et al., "Feed-forward echo state networks", IEEE International Joint Conference on Neural Networks, 2005, vol. 3, pp. 1479-1482.
Chang et al., "VideoQ: a fully automated video retrieval system using motion sketches", Fourth IEEE Workshop on Applications of Computer Vision. WACV'98 (Cat. No. 98EX201), Oct. 19-21, 1998, pp. 270-271.
Cho et al.,"Efficient Motion-Vector-Based Video Search Using Query by Clip", IEEE International Conference on Multimedia and Expo (ICME) (IEEE Cat. No. 04TH8763), Year: 2004, vol. 2, pp. 1027-1030.
Clement et al."Speaker diarization of heterogeneous web video files: A preliminary study", IEEE International Conference on Acoustics, Speech and Signal Processing (ICASSP),May 22-27, 2011 pp. 4432-4435.
Cococcioni et al., "Automatic diagnosis of defects of rolling element bearings based on computational intelligence techniques", Ninth International Conference on Intelligent Systems Design and Applications, Nov. 30-Dec. 2, 2009, pp. 970-975.
Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.

(56) References Cited

OTHER PUBLICATIONS

Fathy et al., "A parallel design and implementation for backpropagation neural network using MIMD architecture", 8th Mediterranean Electrotechnical Conference on Industrial Applications in Power Systems, Computer Science and Telecommunications (MELECON 96) ,May 16, 1996,1472-1476.
Foote et al.,"Content-based retrieval of music and audio", Multimedia Storage and Archiving Systems II, Published in SPIE Proceedings vol. 3229, Oct. 6, 1997, p. 1.
Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.
Ivan Garcia, "Solving the Weighted Region Least Cost Path Problem Using Transputers", Naval Postgraduate School Monterey, California ,1989 pp. 73.
Gomes et al., "Audio Watermarking and Fingerprinting: For Which Applications?", Journal of New Music Research 32(1) Mar. 2003 p. 1.
Gong et al., "A Knowledge-Based Mediator for Dynamic Integration of Heterogeneous Multimedia Information Sources", International Symposium on Intelligent Multimedia, Video and Speech Processing, Oct. 20-22, 2004, pp. 467-470.
Guo et al., "AdOn: An Intelligent Overlay Video Advertising System", https://doi.org/10.1145/1571941.1572049, Jul. 2009, pp. 628-629.
Howlett et al., "A Multi-Computer Neural Network Architecture in a Virtual Sensor System Application", International Journal of Knowledge-Based and Intelligent Engineering Systems, vol. 4, Published—Apr. 2000 pp. 86-93.
Hua et al., "Robust Video Signature Based on Ordinal Measure", International Conference on Image Processing ICIP '04. 2004, Oct. 24-27, 2004, pp. 5.
Iwamoto et al, "Image Signature Robust to Caption Superimposition for Video Sequence Identification", 2006 International Conference on Image Processing ,IEEE, Atlanta, GA, Oct. 8-11, 2006, pp. 3185-3188.
Herbert Jaeger, "The"echo state" approach to analysing and training recurrent neural networks", Bonn, Germany: German National Research Center for Information Technology GMD Technical Report, 148 ,2001, pp. 43.
Jianping Fan et al., "Concept-Oriented Indexing of Video Databases: Toward Semantic Sensitive Retrieval and Browsing", IEEE Transactions on Image Processing, vol. 13, No. 7, Jul. 2004, p. 1.
John L. Johnson., Pulse-coupled neural nets: translation, rotation, scale, distortion, and intensity signal invariance for images, vol. 33, No. 26, Applied Optics, Sep. 10, 1994, pp. 6239-6253.
Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.
Kabary et al., "SportSense: Using Motion Queries to Find Scenes in Sports Videos", DOI: 10.1145/2505515.2508211, Oct. 2013, pp. 2489-2491.
Keiji Yanai., "Generic Image Classification Using Visual Knowledge on the Web", DOI: 10.1145/957013.957047, Jan. 2003, pp. 167-176.
Lau et al., "Semantic Web Service Adaptation Model for a Pervasive Learning Scenario", Proceedings of the 2008 IEEE Conference on innovative Technologies in Intelligent Systems and Industrial Applications Multimedia University, Cyberjaya, Malaysia. Jul. 12-13, 2008, pp. 98-103.
Li et al., "Matching Commercial Clips from TV Streams Using a Unique, Robust and Compact Signature", DOI: 10.1109/DICTA. 2005.52, Jan. 2006, pp. 7.
Lin et al., "Generating Robust Digital Signature for Image/Video Authentication", Multimedia and Security Workshop at ACM Multimedia '98. Bristol. U.K., Sep. 1998, pp. 49-54.
Löytynoja et al., "Audio Encryption Using Fragile Watermarking", DOI: 10.1109/ICICS.2005.1689175, Jul. 2015, pp. 881-885.
Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pp. 5.
Maass et al., "Computational Models for Generic Cortical Microcircuits", DOI: 10.1201/9780203494462.ch18, Jun. 10, 2003, pp. 1-26.
Mahdhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.
May et al., "The Transputer", Neural Computers. Springer Study Edition, vol. 41. Springer, Berlin, Heidelberg, DOI: 10.1007/978-3-642-83740-1_48, Jan. 1989 pp. 477-486.
McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.
Mei et al., "Contextual in-image Advertising",MM'OS, Oct. 26-31, 2008. Vancouver, British Columbia, Canada. Copyright 2008 ACM 978-1-60558-303-7/08/10, DOI: 10.1145/1459359.1459418•Source: DBLP, Jan. 2008, pp. 439-448.
Mei et al., "VideoSense—Towards Effective Online Video Advertising", MM'07, Sep. 23-28, 2007, Augsburg, Bavaria, Germany. Copyright 2007 ACM 978-1-59593-701-8/07/0009 . . . $5.00, Jan. 2007, pp. 1075-1084.
Mladenovic et al., "Electronic Tour Guide for Android Mobile Platform with Multimedia Travel Book" 20th Telecommunications forum Telfor 2012, DOI: 10.1109/TELFOR.2012.6419494, Nov. 20-22, 2012, pp. 1460-1463.
Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.
Nagy et al., "A Transputer Based, Flexible, Real-Time Control System for Robotic Manipulators", UKACC International Conference on Control '96, Conference Publication No. 427 © IEE 1996, Sep. 2-5, 1996, pp. 84-89.
Nam et al., "Audio-Visual Content-Based Violent Scene Characterization", Proceedings 1998 International Conference on Image Processing. ICIP98 (Cat. No. 98CB36269), DOI: 10.1109/ICIP. 1998.723496, pp. 353-357.
Natschlager et al., "The "Liquid Computer": A Novel Strategy for Real-Time Computing on Time Series", Jan. 2002, pp. 1-7.
Nouza et al., "Large-Scale Processing, Indexing and Search System for Czech Audio-Visual Cultural Heritage Archives", DOI: 10.1109/MMSP.2012.6343465, Sep. 2012, pp. 337-342.
Odinaev., "Cliques tu Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.
Park et al., "Compact Video Signatures for Near-Duplicate Detection on Mobile Devices", DOI: 10.1109/ISCE.2014.6884293, Jun. 2014, pp. 1-2.
Maria Paula Queluz., "Content-based integrity protection of digital images", San Jose. California •Jan. 1999 SPIE vol. 3657 •0277-786X/99/$10.00, DOI: 10.1117/12.344706, Apr. 1999, pp. 85-93.
Raichelgauz et al., "Co-evoletiooary Learning in Liquid Architectures", DOI: 10.1007/11494669_30, Jun. 2005, pp. 241-248.
Ribert et al., "An Incremental Hierarchical Clustering", Vision Interface '99, Trois-Rivieres, Canada, May 19-21, pp. 586-591.
Jasinschi et al., A Probabilistic Layered Framework for Integrating Multimedia Content and Context Information, 2002, IEEE, pp. 2057-2060. (Year: 2002).
Jones et al., "Contextual Dynamics of Group-Based Sharing Decisions", 2011, University of Bath, pp. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

(56) References Cited

OTHER PUBLICATIONS

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

\* cited by examiner

BLIND SPOT ALERT

CROSS REFERENCE

This application claims priority from U.S. provisional patent 62/836,680 filing date Apr. 21, 2019.

BACKGROUND

A blind spot is an area that cannot be seen directly by a driver.

Many accidents involve vehicles and/or road users that were positioned within a blind spot of another vehicle.

There is a growing to detect blind spots.

SUMMARY

There may be provided a method, system and computer readable medium for dealing with blind spots.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Figure 1:
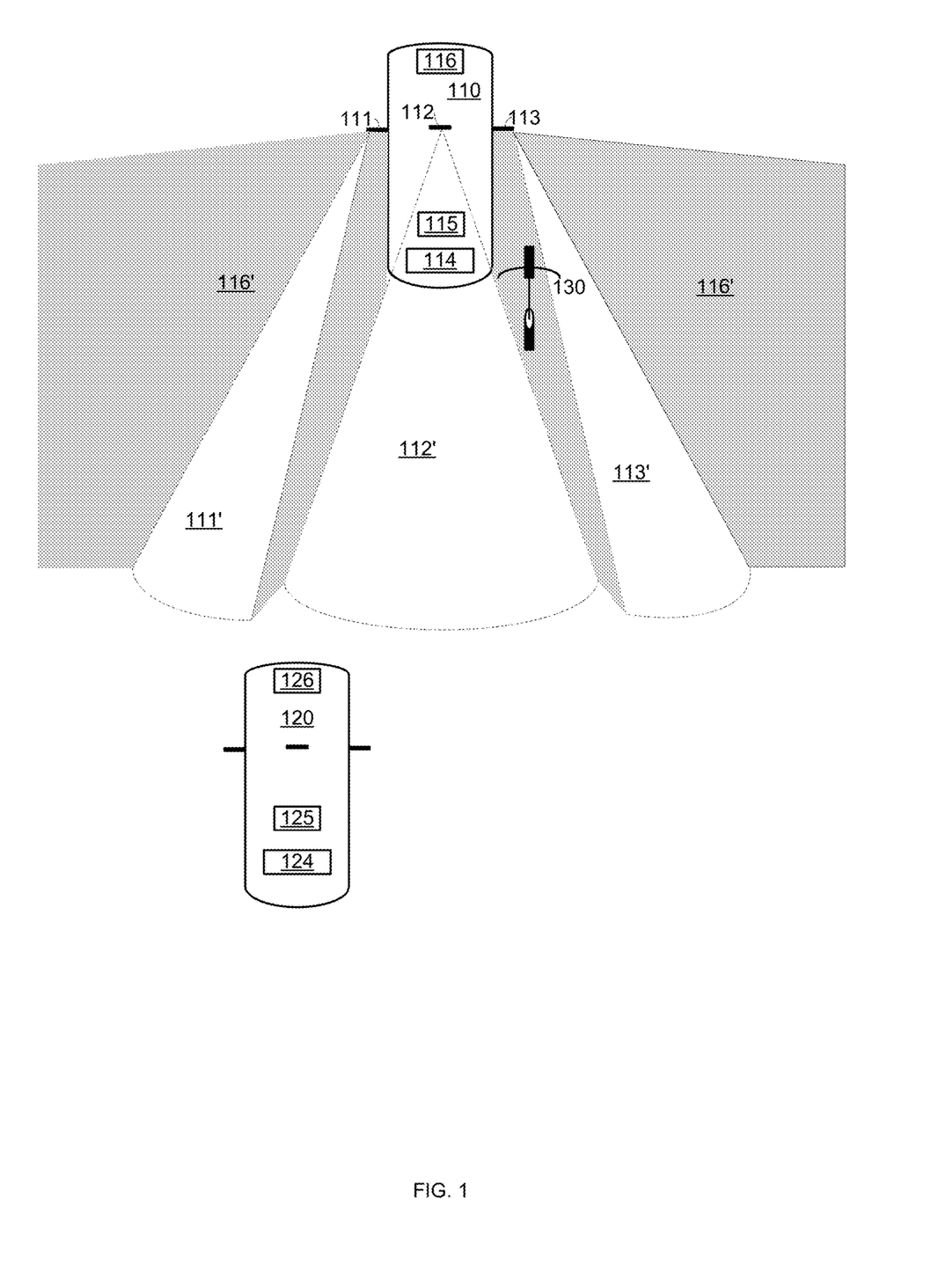
FIG. 1 illustrates an example of blind spots.
Figure 2:
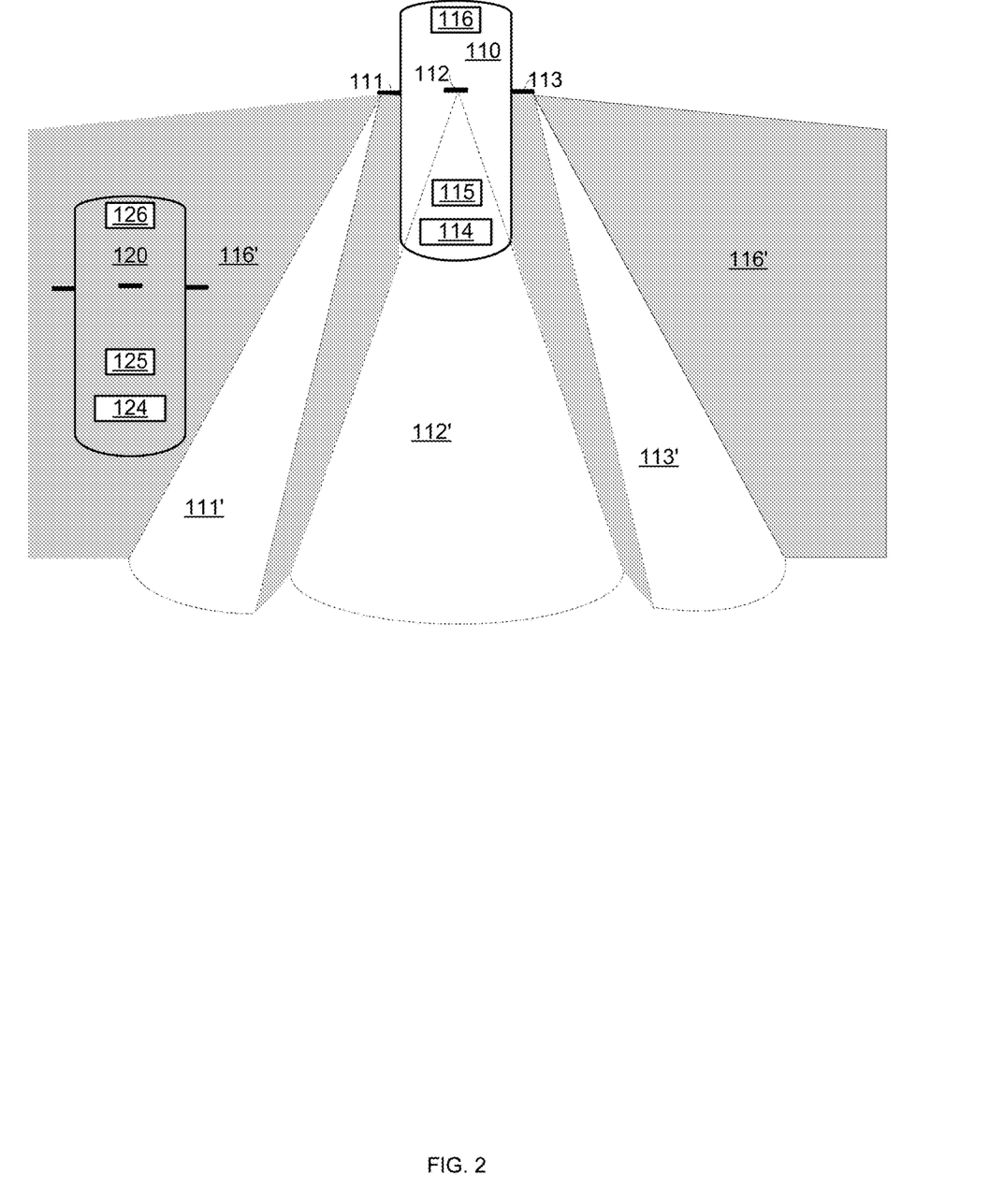
FIG. 2 illustrates an example of blind spots.

FIGS. 1 and 2 illustrate a first vehicle 110 that includes a left mirror 111, a front mirror 112, and a right mirror 113 that have coverage areas 111', 112' and 113' respectively. One or more areas outside these coverage areas may be regarded as a blind spot 116' of first vehicle.

In FIGS. 1 and 2, the second vehicle 120 is either located inside a blind spot or is about to enter the blind spot.

In FIG. 1, a bicycle 130 is also located within the blind spot of the first vehicle.

First vehicle 110 includes, in addition to mirrors 111, 112 and 113, one or more sensors 116, computerized system 115 and communication unit 114.

Second vehicle 120 includes, in addition to various mirrors, one or more sensors 126, computerized system 125 and communication unit 124.

The one or more sensors (116 and/or 126) may be one or more active sensors (that transmit radiation) and/or one or more passive sensors (that sense radiation without transmitting radiation). The one or more sensors may include, for example, radars, sonars, LIRARs, cameras, distanced sensors, inclination sensors, accelerometers, and the like. The radiation sensed by the one or more sensors may be of any frequency and/or bandwidth.

Communication unit (114 and/or 124) may be configured to communicate with other computerized systems and/or other communication units and/or may be configured to communicate with the driver, a road user and the like.

The communication unit may include a man machine interface, may include one or more loudspeaker, may include a vehicle multimedia unit may interface with a vehicle multimedia unit, may include an input/output unit such as a network interface card, universal serial bus (USB) port, disk reader, modem or transceiver that may be operative to use protocols such as are known in the art to communicate either directly, or indirectly, with other elements.

The computerized system (115 and/or 125) may include one or more processing circuitry. Each processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. The computerized system be configured to host or otherwise execute an autonomous driving module and/or an advanced driver assistance module. Each computerized system is configured to execute (in full or in part) any of the mentioned below methods.

Figure 3:
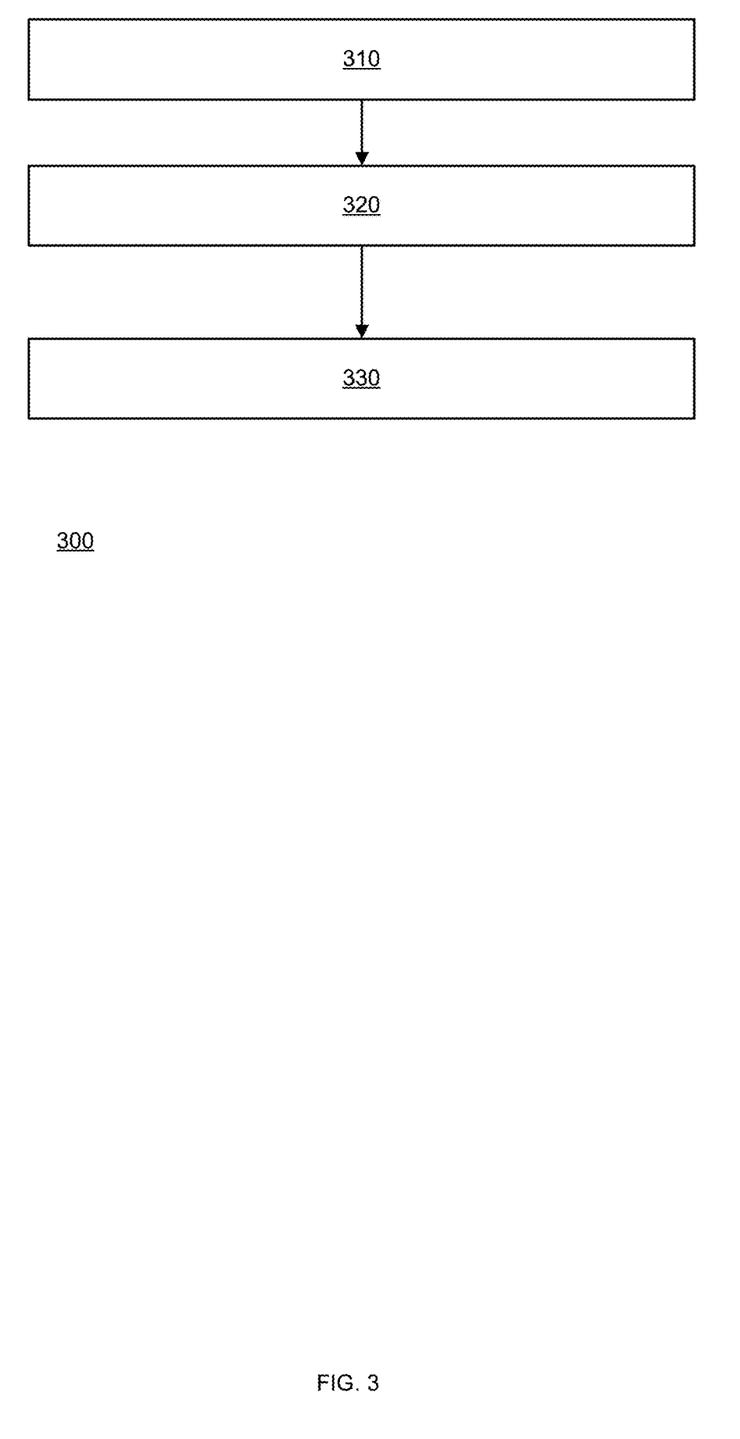
FIG. 3 illustrates an example of a method.

FIG. 3 illustrates an example of method 300.

Method 300 may be for estimating a potential blind spot event related to a potential blind spot of a first vehicle.

Method 300 may start by step 310 of detecting, using at least one sensor of a second vehicle, the first vehicle and a spatial relationship between the first vehicle and the second vehicle.

The detecting of the first vehicle may be executed by a first sensor of the second vehicle and the detecting of the spatial relationship between the first vehicle and the second vehicle may be executed by a second sensor of the second vehicle.

The first sensor and the second sensor may be the same sensor or may differ from each other.

The first sensor may be a camera and the second sensor may be a radar.

The least one sensor may be a camera. Step 310 may include detecting the spatial relationship between the first vehicle and the second vehicle by detecting an object of a known size, within an image of a scene captured by the camera, comparing the known size to a size of the object within the image. The object may be the first vehicle or may differ from the first vehicle.

The at least one sensor may be a camera, and the detecting the spatial relationship between the first vehicle and the second vehicle comprises detecting an optical phenomenon that occurs at a known distance from the camera. The optical phenomenon may be a blending of a bottom of a vehicle and a road.

The detection of the first vehicle may involve generating a signature of one or more images acquired by a sensor of the second vehicle, comparing the signature to clusters of signatures that are associated with different objects, finding one or more matching clusters (having one or more signatures that match the signature of the image) and when a matching signature is associated with a class, sub-class and the like determine the class or subclass of the first vehicle.

Step 310 may be followed by step 320 of estimating, based on at least one blind spot parameter of the first vehicle, an occurrence of the potential blind spot event.

The potential blind spot event may occur when (i) the second vehicle may be within a potential blind spot of the first vehicle (FIG. 1), or (ii) when the second vehicle may be about to enter the potential blind spot of the first vehicle (FIG. 2).

The at least one potential blind spot parameter of the first vehicle may include a class or subclass of vehicles that includes the first vehicle. The class may be selected out of a four-wheel vehicle and a two-wheel vehicle. The subclass may be selected out of a private car, a bus, a truck, a bicycle, a motorcycle. The subclass may also be selected out of the manufacturer of the vehicle, the model of the vehicle, a year of the vehicle, and the like.

The exact span of the blind spot may be dependent on various parameters some of which (referred to as additional potential blind spot parameters) may not be known to the second vehicle—for example—the actual orientation of at least one mirror of the first vehicle and a spatial relationship between a driver of the first vehicle and the at least one mirror of the first vehicle. The spatial relationship related to the driver may depend on the height of the driver, the location (for example—distances from the wheel) of the driver's seat, inclination of the driver seat, and the like.

Accordingly—step 320 may include generating a coarse estimate of the potential blind spot of the first vehicle.

The coarse estimate may ignore parameters not known yet to the second vehicle and/or may include assuming an existence of a worst case (or any other sub-optimal) potential blind spot scenario. This assumption may be based on the maximal size of the blind spot, or a coverage that does not include the second vehicle.

Step 320 may also include detecting at least one additional potential blind spot parameter and fine tuning the coarse estimate to provide a finer estimate of the potential blind spot of the first vehicle. The at least one additional potential blind spot parameter (for example orientation of the mirror may be detected using image processing or any other means. Additionally or alternatively, the at least one additional potential blind spot parameter may be provided by the first vehicle or even another system external to both vehicles.

Step 320 may include estimating of whether the second vehicle is about to enter the potential blind spot of the first vehicle by estimating future spatial relationships between the first vehicle and the second vehicle. This estimate of the future spatial relationship may include estimating the future trajectory of the first and second vehicles.

Step 320 may be also responsive to at least one environmental parameter related to an environment of the first vehicle.

The environmental parameter may be related to at least one out of an orientation of a path segment between the first and second vehicles, a curvature of the path segment, one or more obstacles positioned between the first and second vehicles and visibility conditions, and the like.

The at least one environmental parameter may be sensed by the second vehicle and/or may be provided to the second vehicle. For example, the orientation may be sensed by an orientation sensor, may be determined based on analysis of an image acquired by a camera of the second vehicle, and the like. The location of the second vehicle may be used to retrieve the environmental parameter from a database that maps various environmental parameters to locations. The database may be stored at the second vehicle or elsewhere.

Step 320 may be followed by step 330 of responding to the estimated occurrence of the potential blind spot event.

The responding may include at least one of the following:
Sending a potential blind spot event alert to at least one of the driver of the first vehicle and the first vehicle.
Receiving feedback from at least one of the driver of the first vehicle and the first vehicle about an accuracy of the estimating of the occurrence of the potential blind spot event. The feedback may be—the second vehicle is within a blind spot of the first vehicle, the second vehicle is outside the blind spot of the first vehicle, the second vehicle can be barely seen, and the like. The feedback may provide one or more additional potential blind spot parameters.
Responding to the feedback.
Responding to the feedback by requesting from at least one of the first vehicle and the driver of the first vehicle to alter at least one of a position and an orientation of at least one mirror of the first vehicle. The altering may be requested such as to reduce the risk related to the blind spot—for example changing speed and/or direction to increase the distance between the vehicles, allowing the second vehicle to exit a blind spot, slowing down the first vehicle until the second vehicle is far enough and/or outside the blind spot, and the like.
Altering an autonomous driving pattern of the second vehicle.
Generating by the second vehicle, a human perceivable potential blind spot event alert.
Suggesting, by an advance driver assistance system, a suggested driving path based on the estimated occurrence of the potential blind spot event alert. The suggested path may be designed to reduce the risk related to the blind spot—for example changing speed and/or direction to increase the distance between the vehicles, allowing the second vehicle to exit a blind spot, slowing down the second vehicle until the second vehicle is far enough and/or outside the blind spot, and the like.

Initiating a negotiation, between autonomous driving systems of the first and second vehicle, regarding an introduction of at least one change in an autonomous driving pattern of at least one vehicle of the first and second vehicles. The change may be determine using a by arbitration and/or distributed decision process.

Participating in the negotiation.

Introducing a negotiated change in an autonomous driving pattern of at least one vehicle of the first and second vehicles.

Informing other computerized devices that share a road with the second vehicle about the estimated occurrence of the potential blind spot event.

Informing other computerized devices that are within a proximity of the second vehicle about the estimated occurrence of the potential blind spot event.

Alerting a road user about the blind spot.

Figure 4:
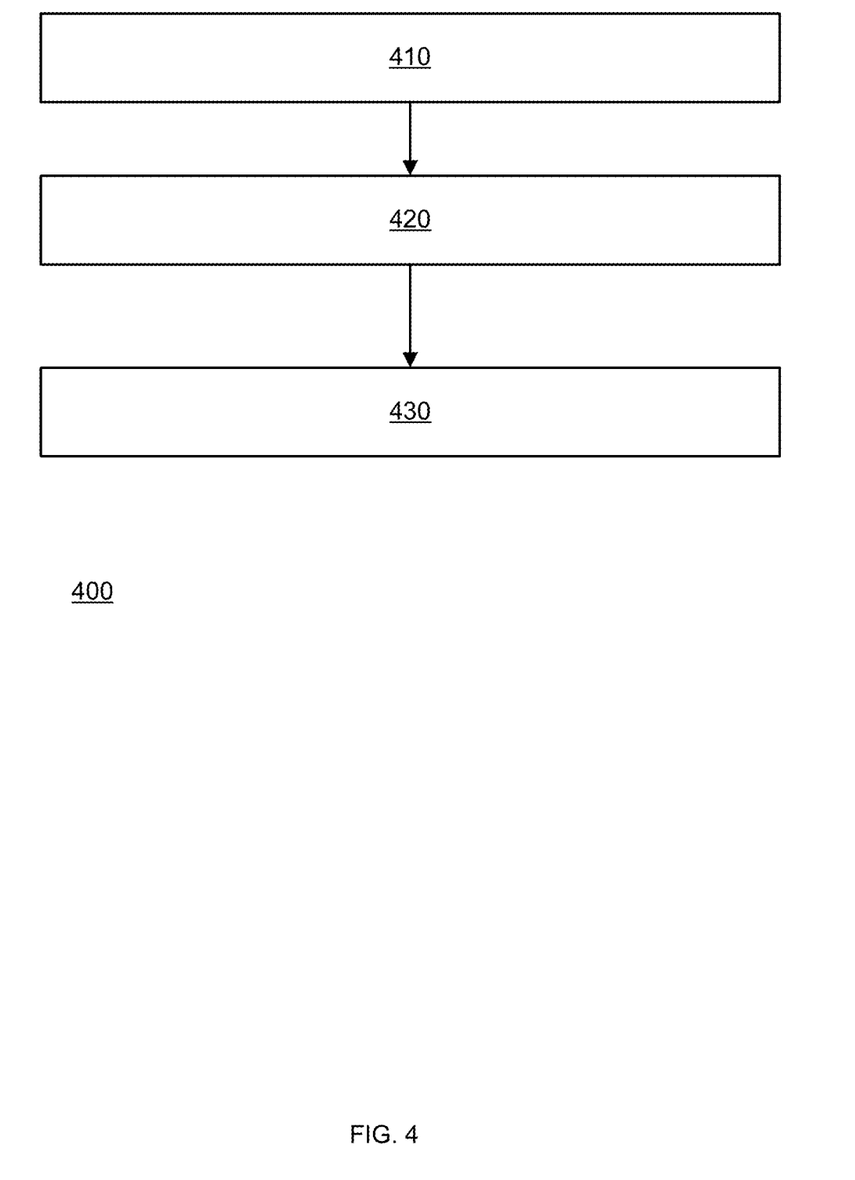
FIG. 4 illustrates an example of a method.

FIG. 4 illustrates an example of method 400.

Method 400 may be for estimating a potential blind spot event related to a potential blind spot of a first vehicle.

Method 400 may start by step 410 of detecting, using at least one sensor of a second vehicle, an existence of a road user, the first vehicle and a spatial relationship between the first vehicle and the road user.

Step 410 may use any of the sensors and/or operations applied during step 310.

Step 410 may be followed by step 420 of estimating, based on at least one blind spot parameter of the first vehicle, an occurrence of the potential blind spot event; wherein the potential blind spot event occurs when the road user is within a potential blind spot of the first vehicle or is about to enter the potential blind spot of the first vehicle.

Step 420 may apply any of the operations used in step 320.

Step 420 may be followed by step 430 of alerting at least one of the road user and the first vehicle about the estimated occurrence of the potential blind spot event.

The road user may be a pedestrian that walks, stands, drives a two wheel of single wheel vehicle, and the like.

The alert may be aimed, for example, to a rider of bicycle 130 of FIG. 1.

Figure 5:
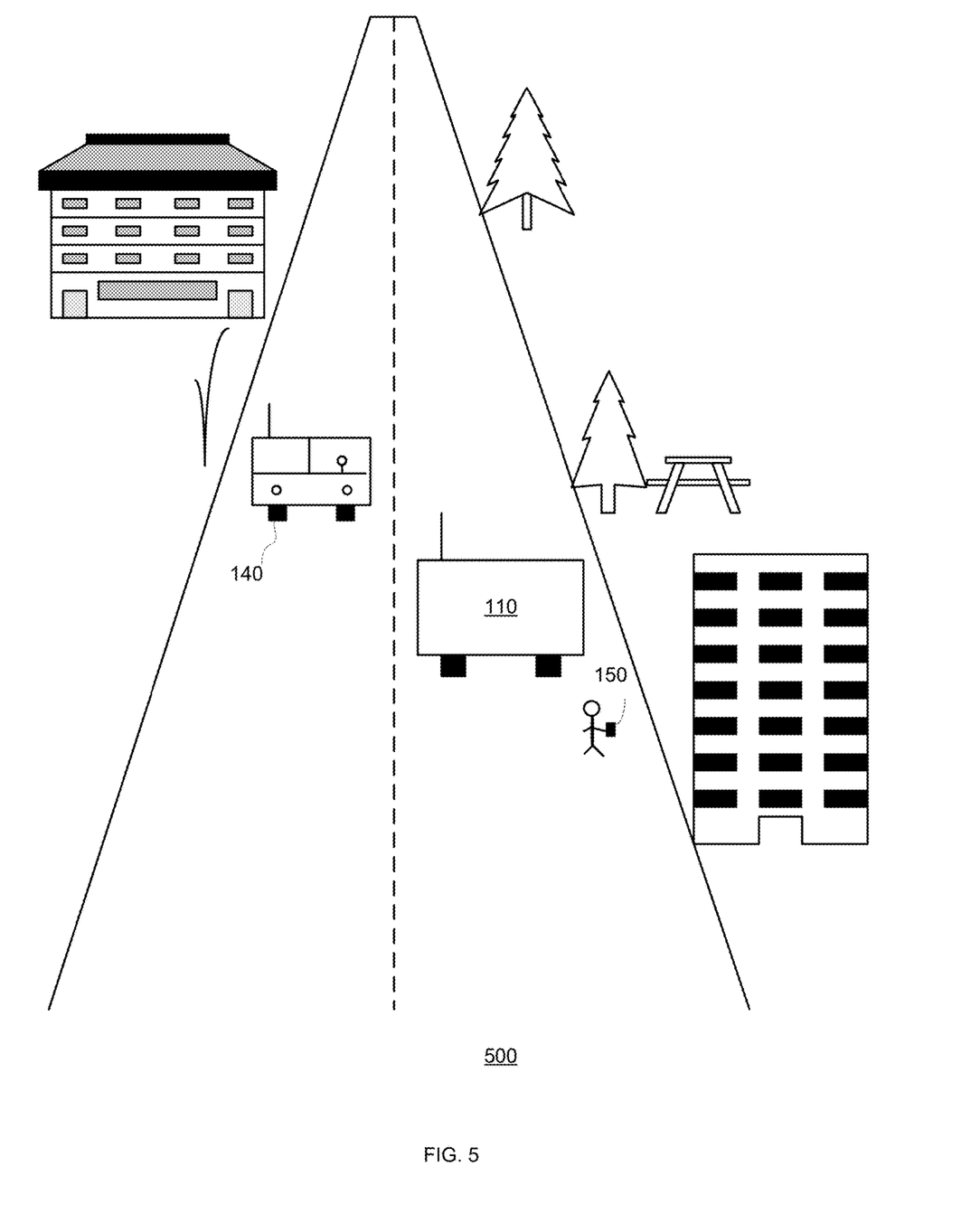
FIG. 5 illustrates an example of an image.

FIG. 5 illustrates an image 500 acquired by a sensor of the second vehicle 120.

The image illustrates various building, trees that surround a bi-directional road.

The image 500 also illustrates first vehicle 110, third vehicle 140, a pedestrian that has a mobile device 150.

The vehicles (first vehicle 110, second vehicle, third vehicle 140) and computerized devices such the mobile phone 150 may receive and/or transmit information related to the blind spot of any vehicle, road users and/or vehicle located within a blind spot and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for estimating a potential blind spot event related to a potential blind spot of a first vehicle, the method comprises:
    detecting, using at least one sensor of a second vehicle, the first vehicle and a spatial relationship between the first vehicle and the second vehicle;
    estimating, based on at least one blind spot parameter of the first vehicle, an occurrence of the potential blind spot event; wherein the potential blind spot event occurs when the second vehicle is within a potential blind spot of the first vehicle or is about to enter the potential blind spot of the first vehicle; and
    responding to the estimated occurrence of the potential blind spot event; wherein the responding comprises sending a potential blind spot event alert to at least one of the driver of the first vehicle and the first vehicle.

2. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event;
    wherein the estimating comprising generating a coarse estimate of the potential blind spot of the first vehicle.

3. The method according to claim 2 wherein the generating of the coarse estimate is based on an assumption of an existence of a worst case potential blind spot scenario.

4. The method according to claim 3 detecting at least one additional potential blind spot parameter and fine tuning the coarse estimate to provide a finer estimate of the potential blind spot of the first vehicle.

5. The method according to claim 4 wherein the at least one additional potential blind spot parameter is selected out of an orientation of at least one mirror of the first vehicle and a spatial relationship between a driver of the first vehicle and the at least one mirror of the first vehicle.

6. The method according to claim 1 wherein the at least one potential blind spot parameter of the first vehicle is a class of the vehicle and wherein the estimating is responsive to the class of the vehicle, wherein the class of the vehicle is selected out of a four wheel vehicle and a two wheel vehicle.

7. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event;
    wherein the at least one potential blind spot parameter of the first vehicle is a subclass of the vehicle and wherein the estimating is responsive to the subclass of the vehicle, wherein the subclass of the vehicle is selected out of a private car, a bus, a truck, a bicycle and a motorcycle.

8. The method according to claim 1 wherein the detecting of the first vehicle is executed by a first sensor of the second vehicle and the detecting of the spatial relationship between the first vehicle and the second vehicle is executed by a second sensor of the second vehicle.

9. The method according to claim 8 wherein the first sensor and the second sensor differ from each other.

10. The method according to claim 8 wherein the first sensor is a camera and the second sensor is a radar.

11. The method according to claim 1 wherein the at least one sensor is a camera, and wherein the detecting the spatial relationship between the first vehicle and the second vehicle comprises detecting an object of a known size, within an image of a scene captured by the camera, comparing the known size to a size of the object within the image.

12. The method according to claim 11 wherein the object is the first vehicle.

13. The method according to claim 11 wherein the object differs from the first vehicle.

14. The method according to claim 1 wherein the at least one sensor is a camera, and wherein the detecting the spatial relationship between the first vehicle and the second vehicle comprises detecting an optical phenomenon that occurs at a known distance from the camera.

15. The method according to claim 14 wherein the optical phenomenon is a blending of a bottom of a vehicle and a road.

16. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event; wherein the estimating of whether the second vehicle is about to enter the potential blind spot of the first vehicle comprises estimating future spatial relationships between the first vehicle and the second vehicle.

17. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event;

wherein the estimating is also responsive to at least one environmental parameter related to an environment of the first vehicle.

18. The method according to claim 17 wherein the at least one environmental parameter is related to at least one out of an orientation of a path segment between the first and second vehicles, a curvature of the path segment, one or more obstacles positioned between the first and second vehicles and visibility conditions.

19. The method according to claim 1 comprising receiving feedback from at least one of the driver of the first vehicle and the first vehicle about an accuracy of the estimating of the occurrence of the potential blind spot event and responding to the feedback.

20. The method according to claim 19 wherein the responding comprises requesting from at least one of the first vehicle and the driver of the first vehicle to alter at least one of a position and an orientation of at least one mirror of the first vehicle.

21. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event;

wherein the responding comprises altering an autonomous driving pattern of the second vehicle.

22. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event wherein the responding comprises generating by the second vehicle, a human perceivable potential blind spot event alert.

23. The method according to claim 1 wherein the responding comprises suggesting, by an advance driver assistance system, a suggested driving path based on the estimated occurrence of the potential blind spot event alert.

24. The method according to claim 1 wherein the responding comprises initiating a negotiation, between autonomous driving systems of the first and second vehicle, regarding an introduction of at least one change in an autonomous driving pattern of at least one vehicle of the first and second vehicles.

25. A method for estimating a potential blind spot event related to a potential blind spot of a first vehicle, the method comprises: detecting, using at least one sensor of a second vehicle, the first vehicle and a spatial relationship between the first vehicle and the second vehicle; estimating, based on at least one blind spot parameter of the first vehicle, an occurrence of the potential blind spot event wherein the potential blind spot event occurs when the second vehicle is within a potential blind spot of the first vehicle or is about to enter the potential blind spot of the first vehicle; and responding to the estimated occurrence of the potential blind spot event;

wherein the method comprises informing at least one out of (a) other computerized devices that share a road with the second vehicle and (b) computerized devices that are within a proximity of the second vehicle, about the estimated occurrence of the potential blind spot event.

26. The method according to claim 1 comprising informing other computerized devices that are within a proximity of the second vehicle about the estimated occurrence of the potential blind spot event.

27. A non-transitory computer that stores instructions for estimating a potential blind spot event related to a potential blind spot of a first vehicle, by:

detecting, using at least one sensor of a second vehicle, the first vehicle and a spatial relationship between the first vehicle and the second vehicle;

estimating, based on at least one blind spot parameter of the first vehicle, an occurrence of the potential blind spot event; wherein the potential blind spot event occurs when the second vehicle is within a potential blind spot of the first vehicle or is about to enter the potential blind spot of the first vehicle; and responding to the estimated occurrence of the potential blind spot event; wherein the responding comprises sending a potential blind spot event alert to at least one of the driver of the first vehicle and the first vehicle.

* * * * *